March 25, 1924.
N. M. CORRIGAN
LIGHTING DEVICE FOR VEHICLES
Filed Feb. 19, 1923
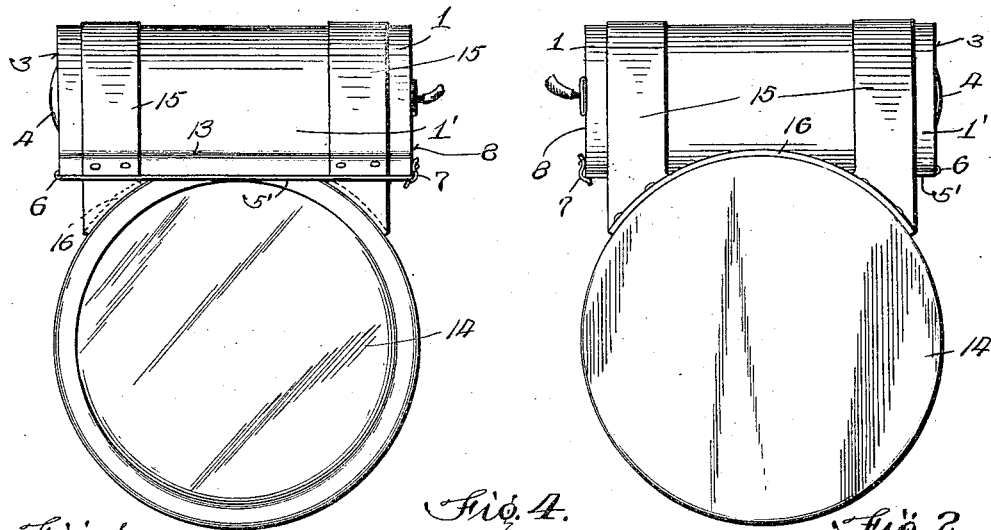
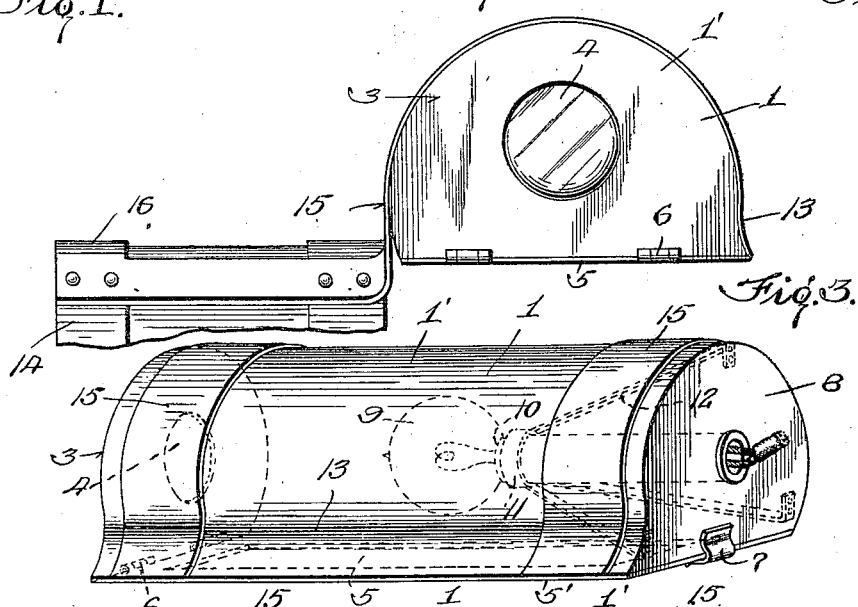
Inventor:
Nellie M. Corrigan
By
Wm. E. Boulter,
Attorney.

Patented Mar. 25, 1924.

1,487,724

UNITED STATES PATENT OFFICE.

NELLIE M. CORRIGAN, OF KANSAS CITY, MISSOURI.

LIGHTING DEVICE FOR VEHICLES.

Application filed February 19, 1923. Serial No. 619,946.

*To all whom it may concern:*

Be it known that I, NELLIE M. CORRIGAN, a citizen of the United States, residing at Kansas City, in the county of Jackson and State of Missouri, have invented certain new and useful Improvements in Lighting Devices for Vehicles, of which the following is a specification.

My invention has relation to lighting devices for automobiles and other vehicles and embodies an electric lamp attached to each of the usual headlights of a vehicle and containing an electric light bulb adapted to be lighted from a suitable switch on the instrument board of the vehicle, each of the lamps embodied in my invention being so constructed and arranged relatively to the headlamp as to illuminate the front of the car and also throw a strong light downwardly upon the roadway forwardly of the headlamp, i. e., immediately in advance of the vehicle, whereby the car will be more readily seen by an approaching motorist and pedestrians and whereby to illuminate the roadway and detect the depth of holes and ruts in front of the vehicle which the usual headlamp fails to expose.

The lamps embodied in my invention may be used to supplement the usual headlamps whereby to increase the amount of light thrown upon the roadway, which is of great advantage especially when driving in dark streets or roads, or they may be used independently of the usual headlamps for driving in well-lighted streets.

The lamps are so constructed that the light therefrom is thrown downwardly and thus not glare into the eyes of approaching motorists or pedestrians. Ready access to the interior of the lamps is provided for the purpose of cleaning the interior, and insertion and removal of the light bulbs when necessary.

Other features are embodied in my invention, which consists in the novel construction, arrangement and combination of parts as hereinafter fully described, illustrated in the drawings and pointed out in the appended claims.

In the drawings:

Figure 1 is a front elevation of an ordinary headlamp of an automobile having my invention applied thereto.

Figure 2 is a rear elevation of the parts seen in Figure 1.

Figure 3 is a perspective view of my invention.

Figure 4 is an end view of same.

Figure 5 is a vertical longitudinal section of the invention.

The lamp 1 embodying my invention comprises a metallic casing 1′ which is somewhat of cylindrical shape, the interior curved surface of which is highly polished or silver or nickel-plated to provide a good reflecting surface. One end 3 of the casing is provided with an opening in which is fitted a frosted glass lens 4 to permit light to pass therethrough.

The casing is open at its underside and in the opening is arranged a clear glass lens 5 having a frame 5′ which is suitably hinged at one end as at 6 to the end 3 of the casing whereby said lens may be swung downwardly to give access to the interior of the casing for cleaning said interior and for insertion and removal of an electric light bulb.

The other end of the lens 5 is adapted to be supported in position by any suitable means, as for instance a spring catch or clip 7 carried by the end 8 of the casing and adapted to engage with the edge of the framing of lens 5.

The electric light bulb 9 and its plug 10 are adapted to be suitably held in position within the casing by any desired means, as for instance a metal band 11 carried by one end of several supporting arms 12, preferably three in number, the other end of which arms is secured to the casing.

Suitable electric connections are to be provided between the bulb and the source of electric current and in practice the lighting and extinguishing of the lamp is to be controlled by a suitable switch located within easy reach of the driver of the vehicle, said switch to be independent of the usual switch provided for the regular headlamps.

The curved wall of the casing is flared on the forward side adjacent its lower edge, as indicated at 13, whereby the light from the bulb will be directed sufficiently to the front to illuminate the roadway somewhat in advance of the front wheels of the vehicle.

In practice I provide one of the supplementary lamps for each of the regular headlamps and I preferably attach each of the supplementary lamps to a headlamp in such a position as to give the best lighting effect.

I show the lamp 1 arranged above a headlamp 14 and forward of the front edge of said headlamp so that the rays of light from lamp 1 will be directed downwardly in advance of the headlamp and over the roadway to brightly light the latter and disclose the depth of ruts and holes therein, which last-named result it is impossible to attain with the usual headlamp.

Any suitable means may be employed for attaching the lamp 1 to a headlamp 14, a convenient means being two metallic bands 15 connected integrally by a strip 16, the latter being riveted, bolted or otherwise secured to the lamp 14, while the bands are similarly secured to the casing 1' of the lamp 1.

The lamp 1 may be varied in size according to the style of car upon which it is used. For an ordinary sized car the lamp would be approximately six inches long and three and one-half inches in diameter.

My invention provides an extremely simple, economical and efficient device supplementary to or independently of the usual headlamps of a vehicle and by reason of the curved reflecting surface of the lamps and the arrangement of the latter relatively to the headlamps the light will be concentrated so as to intensely illuminate the roadway and the front end of the vehicle, thus rendering travel much safer than would be the case if my lighting devices were not used.

What I claim and desire to secure by Letters Patent is:

The combination with a headlamp of a vehicle, of a supplementary lamp arranged above the headlamp and forwardly of the front edge of the latter whereby to direct light against the front end of the vehicle and downwardly and forwardly of the headlamp, the said supplementary lamp comprising a somewhat cylindrical-shaped casing, the inner surface of which is adapted to serve as a reflector, said casing having closed ends and being open on its underside, a glazed door closing the opening and being pivotally connected at one end to the casing, means for detachably securing the opposite end of the door to the casing, and means for supporting an electric light bulb within the casing.

In testimony whereof I affix my signature.

NELLIE M. CORRIGAN.